US012581566B2

(12) United States Patent
Li

(10) Patent No.: US 12,581,566 B2
(45) Date of Patent: Mar. 17, 2026

(54) METHOD, COMMUNICATION DEVICE, AND STORAGE MEDIUM FOR PROCESSING INFORMATION

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 18/274,818

(22) PCT Filed: Jan. 29, 2021

(86) PCT No.: PCT/CN2021/074461
§ 371 (c)(1),
(2) Date: Jul. 28, 2023

(87) PCT Pub. No.: WO2022/160271
PCT Pub. Date: Aug. 4, 2022

(65) Prior Publication Data
US 2024/0121857 A1     Apr. 11, 2024

(51) Int. Cl.
*H04W 76/28*         (2018.01)
(52) U.S. Cl.
CPC .................................. *H04W 76/28* (2018.02)
(58) Field of Classification Search
CPC ...... H04W 76/28; H04W 52/02; H04W 68/00
See application file for complete search history.

(56) References Cited

U.S. PATENT DOCUMENTS

| | | | | |
|---|---|---|---|---|
| 10,492,137 B2 * | 11/2019 | Kwon | ............... | H04W 52/0216 |
| 10,568,028 B2 * | 2/2020 | Kim | ...................... | H04W 48/12 |
| 2013/0194991 A1 * | 8/2013 | Vannithamby | ........ | H04W 72/20 |
| | | | | 370/311 |
| 2018/0317200 A1 * | 11/2018 | Kim | ..................... | H04W 68/02 |
| 2019/0342940 A1 | 11/2019 | Ryu et al. | | |
| 2020/0120604 A1 | 4/2020 | Nam et al. | | |
| 2020/0322393 A1 | 10/2020 | Zhu et al. | | |
| 2021/0297913 A1 * | 9/2021 | Wang | .................... | H04W 76/30 |
| 2022/0353762 A1 * | 11/2022 | Venkata | ............ | H04W 36/0085 |

(Continued)

FOREIGN PATENT DOCUMENTS

| | | |
|---|---|---|
| CN | 108370604 A | 8/2018 |
| CN | 108616950 A | 10/2018 |
| CN | 109792793 A | 5/2019 |

(Continued)

OTHER PUBLICATIONS

Samsung Telecommunications, "On signalling the eDRX capability", 3GPP TSG-RAN WG2 Meeting #92, R2-156261, Nov. 16-20, 2015.

(Continued)

*Primary Examiner* — Abdullahi Ahmed
(74) *Attorney, Agent, or Firm* — Volpe Koenig

(57)          ABSTRACT
Examples of the disclosure provide a method, communication device, and storage medium for processing information. The method for processing information according to the examples of the disclosure is applied to a first base station. The method includes: exchanging, with a second base station, a message for an extended discontinuous reception (e-DRX) function of user equipment (UE) in an inactive state.

19 Claims, 6 Drawing Sheets

(56)                    References Cited

U.S. PATENT DOCUMENTS

2023/0388966 A1 *  11/2023  He  ................... H04W 52/0216

FOREIGN PATENT DOCUMENTS

| CN | 111670604 | A  | 9/2020 |
| CN | 112020879 | A  | 12/2020 |
| CN | 112262600 | A  | 1/2021 |
| WO | 2020118726 | A1 | 6/2020 |

OTHER PUBLICATIONS

Huawei Technologies Co,Ltd, "Extending DRX Cycle in Idle Mode",
3GPP TSG-RAN WG2 #91,R2-153339, Aug. 24-28, 2015.

* cited by examiner

S310: exchange, with a second base station, a message for an extended discontinuous reception (e-DRX) function of user equipment (UE) in an inactive state S311: receive a message, transmitted from a second base station, for an e-DRX function of UE in an inactive state S312: transmit the message for the e-DRX function of the UE in the inactive state to the second base station

METHOD, COMMUNICATION DEVICE, AND STORAGE MEDIUM FOR PROCESSING INFORMATION

CROSS-REFERENCE TO RELATED APPLICATION

The present application is a U.S. National Stage of International Application No. PCT/CN2021/074461, filed on Jan. 29, 2021, the contents of all of which are incorporated herein by reference in their entirety for all purposes.

BACKGROUND

For services, terminal devices balance low power consumption and requirements with a time delay. In each extended discontinuous reception (e-DRX) cycle, a terminal device can receive downlink data only in a set paging time window (PTW) while the terminal device is in a dormancy state and receives no downlink data at the rest of the time. Such a mode can balance a time delay and power consumption of downlink services, for instance, by remotely suspending gas services.

A PTW exists in each e-DRX cycle. Terminal device monitors a paging channel in the PTW to receive downlink data according to a discontinuous reception (DRX) cycle, and in a dormancy state for the rest of the time.

SUMMARY

Examples of the disclosure provide a method, apparatus, communication device, and storage medium for processing information.

A first aspect of an example of the disclosure provides a method for processing information, performed by a first base station. The method includes exchanging, with a second base station, a message for an extended discontinuous reception (e-DRX) function of user equipment (UE) in an inactive state.

A second aspect of the disclosure provides a communication device. The communication device includes a processor, a transceiver, a memory, and an executable program stored in the memory and runnable by the processor. The processor executes the method for processing information according to the first aspect when running the executable program.

A third aspect of an example of the disclosure provides a computer storage medium. The computer storage medium stores an executable program. The executable program is capable of implementing the method for processing information according to the first aspect after being executed by a processor.

According to the technical solution provided in the examples of the disclosure, a message for the e-DRX function of the UE in the inactive state can be exchanged between base stations, and the message for the e-DRX function of the UE in the inactive state can be simply exchanged between the base stations.

It is to be understood that the above general description and the following detailed description are merely illustrative and explanatory, and cannot limit the examples of the disclosure.

BRIEF DESCRIPTION OF THE DRAWINGS

The drawings here are incorporated into the description as a constituent part of the description, illustrate examples conforming to the disclosure, and serve to explain principles of the examples of the disclosure along with the description.

DETAILED DESCRIPTION

Examples will be described in detail here and shown in the accompanying drawings illustratively. When the following descriptions involve the accompanying drawings, unless otherwise specified, the same numeral in different accompanying drawings denotes the same or similar elements. The embodiments described in the following examples do not denote all embodiments consistent with the examples of the disclosure. On the contrary, the embodiments are merely instances of an apparatus and a method consistent with some aspects of the examples of the disclosure as detailed in the appended claims.

The terms used in the examples of the disclosure are merely to describe the specific examples, instead of limiting the examples of the disclosure. The singular forms such as "a," "an," and "this" used in the examples of the disclosure and the appended claims are also intended to include the plural forms, unless otherwise clearly stated in the context. It is to be further understood that the term "and/or" used here refers to and includes any of one or more of the associated listed items or all possible combinations.

It is to be understood that although the terms such as first, second, and third may be used to describe various information in the examples of the disclosure, the information is not intended to be limited to the terms. The terms are merely used to distinguish the same type of information from each other. For instance, without departing from the scope of the examples of the disclosure, first information can also be called second information, and similarly, second information can also be called first information. Depending on the context, the word "if" used here can be interpreted as "when" or "at the time of" or "in response to determining".

The disclosure relates to, but is not limited to, the technical field of radio communication, and particularly relates to a method, apparatus, communication device, and storage medium for processing information.

Figure 1:
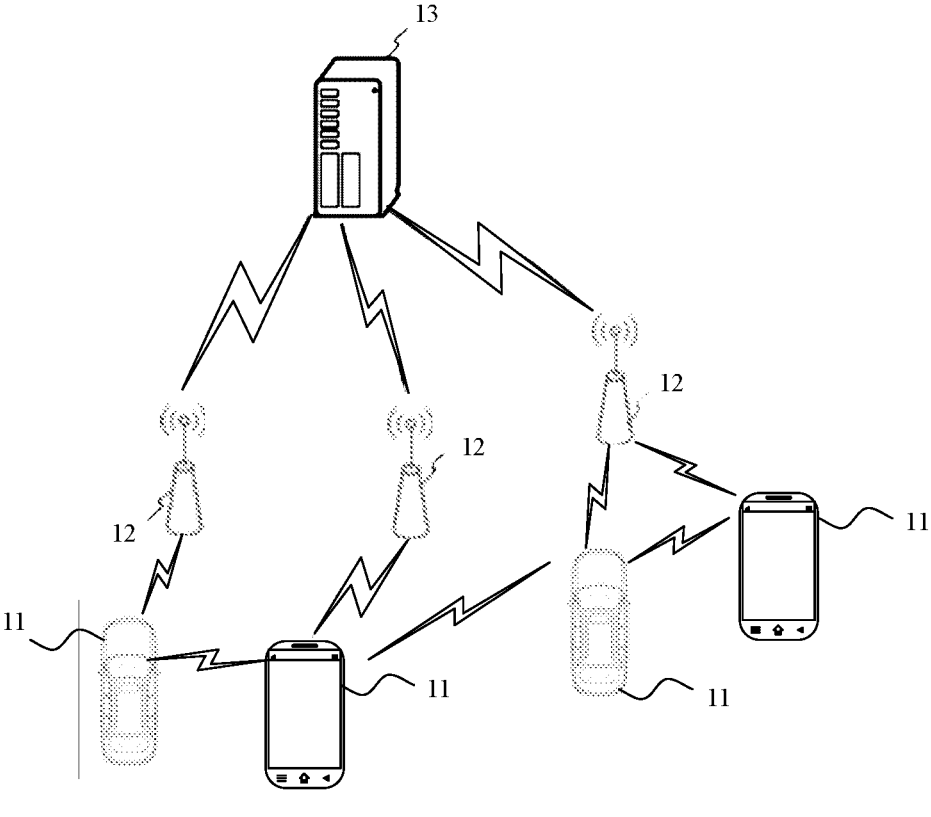
FIG. 1 is a schematic structural diagram of a radio communication system according to an example.

FIG. 1 shows a schematic structural diagram of a radio communication system according to an example of the disclosure. As shown in FIG. 1, the radio communication system is a communication system based on a cellular mobile communication technology. The radio communication system may include: several pieces of user equipment (UE) 11 and several access devices 12.

The UE 11 may refer to a device that provides voice and/or data connectivity for a user. The UE 11 may be in communication with one or more core networks via a radio access network (RAN). The UE 11 may be an Internet of Things UE, such as a sensor device, a mobile telephone (also called a cellular telephone), or a computer having the Internet of Things UE, for instance, a fixed, portable, pocket, hand-held, built-in, or vehicular device. The UE 11 may be a station (STA), a subscriber unit, a subscriber station, a mobile station, a mobile, a remote station, an access point, a remote terminal, an access terminal, a user terminal, a user agent, a user device, or a user equipment (UE). Alternatively, the UE 11 may also be a device of an unmanned aerial vehicle. Alternatively, the UE 11 may also be a vehicular device, for example, the UE 11 may be a vehicle computer having a radio communication function, or a radio communication device connected to the vehicle computer. Alternatively, the UE 11 may also be a roadside device, for instance, a street lamp or a signal lamp, or other roadside devices having a radio communication function.

The access device 12 may be a network device in the radio communication system. The radio communication system may be a 4th generation mobile communication (4G) system, which is also called a long-term evolution (LTE) system. Alternatively, the radio communication system may also be a 5th generation mobile communication (5G) system, which is also called a new radio (NR) system or a 5G NR system. Alternatively, the radio communication system may also be a next-generation system of the 5G system. An access network in the 5G system may be called a new generation-radio access network (NG-RAN). Alternatively, the radio communication system may also be a machine type communication (MTC) system.

The access device 12 may be an evolved Node B (eNB) used in the 4G system. Alternatively, the access device 12 may also be a next generation node B (gNB) with a central and distributed framework used in the 5G system. When using the central and distributed framework, the access device 12 generally includes a central unit (CU) and at least two distributed units (DUs). The central unit is provided with protocol stacks of a packet data convergence protocol (PDCP) layer, a radio link control (RLC) layer, and a media access control (MAC) layer. The distributed unit is provided with a protocol stack of a physical (PHY) layer. A specific embodiment of the access device 12 is not limited to the examples of the disclosure.

An access device 12 may be in radio connection with a UE 11 by Air Interface. In different embodiments, the Air Interface is on the basis of a 4G standard, or the Air Interface is on the basis of a 5G standard, such as a new Air Interface. Alternatively, the Air Interface may also be on the basis of a next-generation mobile communication network technology standard of 5G.

In some examples, an end-to-end (E2E) connection may be further set up between the pieces of the UE 11, which may be vehicle-to-vehicle (V2V) communication, vehicle-to-infrastructure (V2I) communication, vehicle-to-pedestrian (V2P) communication, etc., in vehicle-to-everything (V2X).

In some examples, the radio communication system may further include a network management device 13.

Several access devices 12 are connected to the network management device 13 separately. The network management device 13 may be a core network device in the radio communication system. For instance, the network management device 13 may be a mobility management entity (MME) in an evolved packet core (EPC). Alternatively, the network management device 13 may also be other core network devices, such as a serving gateway (SGW), a public data network gateway (PGW), a policy and charging rules function (PCRF), a home subscriber server (HSS), etc. An implementation form of the network management device 13 is not limited to the examples of the disclosure.

If a terminal device enables an extended discontinuous reception (e-DRX) function, the terminal device may enter an e-DRX mode. The terminal device in the e-DRX mode has the following characteristics: a terminal device may be reached at any time, but a reachable delay is long, and the time delay depends on the configuration of an e-DRX cycle.

In this way, the terminal device enabling the e-DRX function balances the power consumption of the terminal and the timeliness of data transmission to the maximum extent.

The e-DRX function has one or more of the following e-DRX parameters: an initial time domain position of a paging time window (PTW); a length of the PTW; and an e-DRX cycle, which may be represented by $T_{e\text{-}DRX,H}$.

Figure 2:
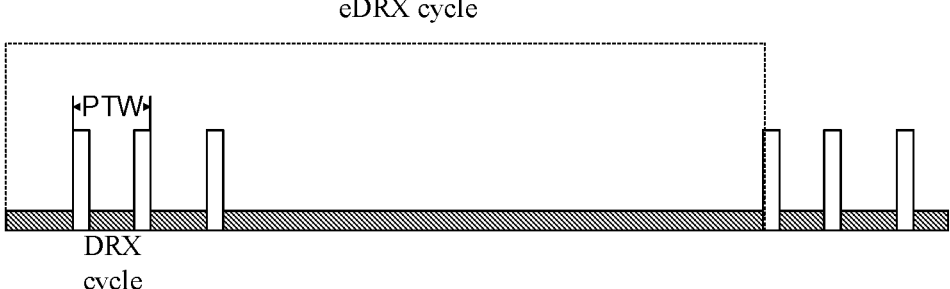
FIG. 2 is a schematic diagram of a timing sequence of executing an extended discontinuous reception (e-DRX) function according to an example.

FIG. 2 shows a timing sequence diagram after a terminal device enables the e-DRX function. With reference to FIG. 2, it may be seen that a PTW exists in an e-DRX cycle, and one or more DRX cycles exist in a PTW. A DRX cycle may have a much shorter duration than the e-DRX cycle.

Figure 3A:
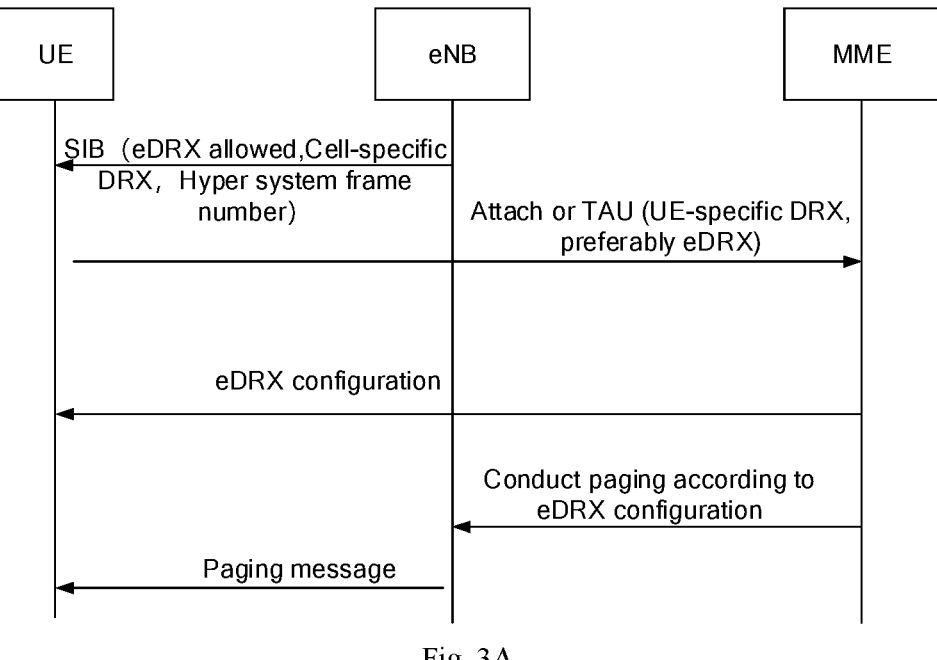
FIG. 3A is a schematic exchange diagram of configuring an idle e-DRX function by a core network according to an example.

FIG. 3A shows one case of exchanging the e-DRX parameter of the e-DRX function between a UE (that is, the terminal device) and a core network.

A method for exchanging an e-DRX parameter between a UE and a core network, as shown in FIG. 3A, may include the following steps. The eNB transmits an indication of an allowed e-DRX function, a cell-specific DRX indication, and a hyper system frame number (SFN) to the UE by means of a system information block (SIB). Next, the UE transmits a UE-specific DRX parameter and/or a preferable DRX parameter in an attach request or a tracking area update (TAU) request. After receiving the attach request or TAU request, the MME transmits the e-DRX configuration to the UE. The e-DRX configuration carries one or more of the above e-DRX parameters. Then, the MME conducts paging according to the e-DRX configuration. Next, the eNB forwards a communication network (CN) paging message to the UE after receiving the CN paging message transmitted from the MME.

The e-DRX parameter, transmitted from the core network, is transmitted to the UE by means of a base station (for instance, the evolved node B (eNB) or the next generation node B (gNB)). For instance, the mobile management entity (MME) of the core network transmits the e-DRX parameter of the e-DRX function to the UE by means of the eNB.

A radio resource control (RRC) inactive state is called an inactive state for short. The inactive state is a low-power consumption state of UE transparent to the core network. However, the inactive state is visible to an access network.

If the UE enters the inactive state, the UE needs to receive the paging message transmitted from a CN (that is, a CN paging message), and further needs to receive a paging message transmitted from the radio access network (that is, a RAN paging message).

Figure 3B:
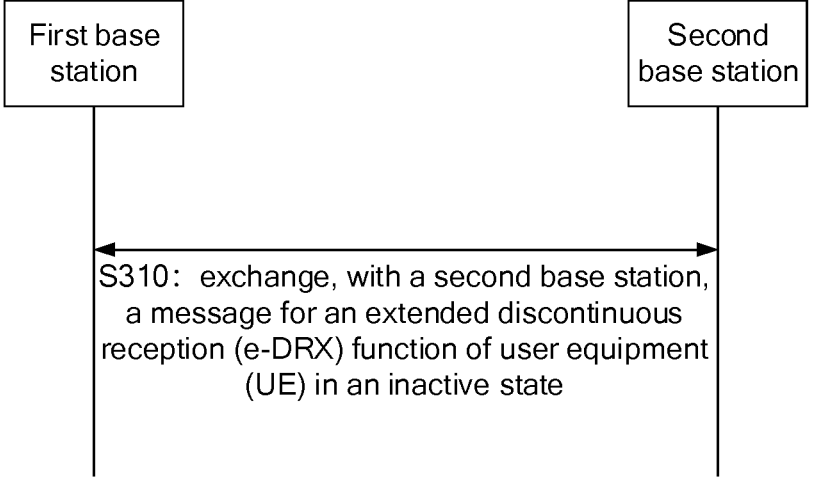
FIG. 3B is a schematic flow diagram of a method for processing information according to an example.

As shown in FIG. 3B, an example of the disclosure provides a method for processing information, which is applied to a first base station. The method includes the following step S310.

In S310: a message for an extended discontinuous reception (e-DRX) function of a user equipment (UE) in an inactive state is exchanged with a second base station.

The first base station may be an anchor base station for the UE in the inactive state or a non-anchor base station other than the anchor base station.

The first base station and the second base station may be base stations located in the same radio notification area (RNA). For instance, the first base station and the second base station may be adjacent to each other.

The message for the e-DRX function of the UE in the inactive state indicates whether to allow the UE in the inactive state to use the e-DRX function or how to configure the UE in the inactive state to conduct the e-DRX function.

The e-DRX function for the UE in the inactive state may also be as follows: a PTW is configured for the UE in the inactive state in a long e-DRX cycle, and one or more persistent objects (POs) are set in a PTW; no PO is configured in the PTW of the e-DRX cycle. In this way, in the entire e-DRX cycle, the UE in the inactive state only needs to wake up in the PTW to monitor the PO, and may stay in a dormancy state for a long time in the non-PTW of the e-DRX cycle, and further power consumption of the UE is reduced.

At the same time, the UE in the inactive state may execute the e-DRX function. By executing the e-DRX function, the UE may well balance accessibility and power consumption of the UE in the inactive state.

It is to be noted that the e-DRX function of the UE in the inactive state may also be called the e-DRX function of the UE in the inactive state.

However, in base stations on a network side, some base stations support the e-DRX function of the UE in the inactive state, while others do not support the e-DRX function of the UE in the inactive state. If the e-DRX function is configured for the UE in the inactive state, the base station transmits the RAN paging message to the UE in the inactive state at different times compared with the UE, without the e-DRX function, in the inactive state. Thus, if the e-DRX function is configured for one or more pieces of UE in the inactive state, information exchange for the e-DRX function of the UE in the inactive state is needed between base stations, and synchronization of the e-DRX function of the UE in the inactive state between base stations is achieved. Further, synchronous paging of the UE in the inactive state by all base stations for the UE in the inactive state in the RAN may be achieved subsequently.

The term "exchange" mentioned in the example of the disclosure may be understood as "transmit" or communicate. For instance, the step that a message for the e-DRX function of a UE in the inactive state is exchanged with a second base station may be understood as follows: a message for the e-DRX function of a UE in the inactive state is transmitted to/from a second base station; or, a message for the e-DRX function of a UE in the inactive state is communicated to the second base station.

Figure 3C:
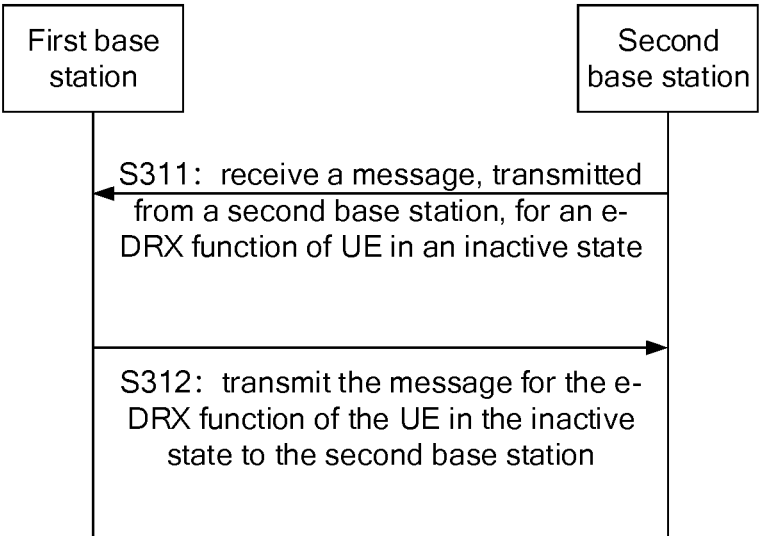
FIG. 3C is a schematic flow diagram of a method for processing information according to an example.

As shown in FIG. 3C, S310 may include the following steps: S311 and/or S132.

In S311: a message, transmitted from the second base station, for the e-DRX function of the UE in the inactive state, is received.

In S312: a message for the e-DRX function of the UE in the inactive state is transmitted to the second base station.

In conclusion, in the example of the disclosure, the step that the message for the e-DRX function of the UE in the inactive state is exchanged between the first base station and the second base station may only include the following step: the first base station transmits a message for the e-DRX function of the UE in the inactive state to the second base station.

The step that the message for the e-DRX function of the UE in the inactive state is exchanged between the first base station and the second base station may only include the following step: a message, transmitted from the second base station, for the e-DRX function of the UE in the inactive state is received.

The step that the message for the e-DRX function of the UE in the inactive state is exchanged between the first base station and the second base station may include the following steps: a message for the e-DRX function of the UE in the inactive state is transmitted to the second base station, and a message, transmitted from the second base station, for the e-DRX function of the UE in the inactive state is received.

In an example, S310 may include the following step: the message for the e-DRX function of the UE in the inactive state is exchanged with the second base station through an inter-base-station interface.

For instance, the first base station may exchange information with the second base station in many ways, including transmission through Air Interface or wired connection between base stations. For instance, information may be transmitted through a backhaul link between base stations, or exchanged through an X2 interface between base stations, or exchanged through an Xn interface between base stations.

Here, the inter-base-station interface may be an interface for direct information exchange between the first base station and the second base station. In this way, information exchange with the inter-base-station interface has characteristics of high information exchange efficiency, a short transmission path, and a short time delay without passing other relay devices.

In an example, S310 may include the following step: a first message is exchanged with the second base station, where the first message is configured for the e-DRX function of the UE in the inactive state, and is configured to enable a base station receiving the first message to execute an operation for the e-DRX function of the UE in the inactive state.

If the first base station is the base station receiving the first message, the first message is configured to enable the first base station to execute a related operation for the e-DRX function of the UE in the inactive state. If the second base station is the base station receiving the first message, the first message is configured to enable the second base station to execute a related operation for the e-DRX function of the UE in the inactive state.

The related operations here may include at least one of operations: an activation operation for activating the e-DRX function of the UE in the inactive state; an inactivation operation for inactivating the e-DRX function of the UE in the inactive state; a configuration operation for configuring the e-DRX function of the UE in the inactive state; an update operation for updating configuration of the e-DRX function of the UE in the inactive state; or a determination operation for not configuring the e-DRX function of the UE in the inactive state.

In an example, the first message carries at least one of: base station capability information indicating whether a base station transmitting the first message supports the e-DRX function of the UE in the inactive state; configuration information indicating that a base station transmitting the first message is the e-DRX function of the UE in the inactive state, where the configuration information includes at least one e-DRX parameter for the e-DRX function; an activation request indicating that a base station transmitting the first message requests to activate the e-DRX function of the UE in the inactive state; or an inactivation request indicating that a base station transmitting the first message requests to inactivate the e-DRX function of the UE in the inactive state.

For instance, if the second base station is the base station transmitting the first message, the first message may be the base station capability information indicating whether the second base station supports the e-DRX function of the UE in the inactive state, such that the UE in the inactive state may know that the second base station supports or not supports the e-DRX function of the UE in the inactive state according to the base station capability information. In this case, if the first message is the activation request or the inactivation request indicating whether to activate or inactivate the e-DRX function of the UE in the inactive state, the first base station may activate or inactivate the e-DRX function for the UE in the inactive state according to the first message. In some cases, the e-DRX parameter for the e-DRX function of the UE in the inactive state is negotiated between the first base station and the second base station.

For another instance, if the first base station is the base station transmitting the first message, the first message may be the base station capability information indicating whether the first base station supports or not supports the e-DRX function of the UE in the inactive state, such that the UE in the inactive state may know that the first base station supports the e-DRX function of the UE in the inactive state according to the base station capability information. In this case, if the first message is the activation request or the inactivation request indicating whether to activate or inactivate the e-DRX function of the UE in the inactive state, the second base station may activate or inactivate the e-DRX function for the UE in the inactive state according to the first message. In some cases, the e-DRX parameter for the e-DRX function of the UE in the inactive state is negotiated between the first base station and the second base station.

For instance, the e-DRX parameters have various sources. For instance, the e-DRX parameter is determined according to a communication protocol, or the e-DRX parameter is determined according to pre-configuration obtained by the UE. For another instance, the e-DRX parameter may be determined through negotiation between the first base station and the second base station, as mentioned above.

In conclusion, the e-DRX parameters mentioned in the examples of the disclosure may include, but are not limited to, at least one of: an e-DRX cycle, an initial time domain position of a PTW, an end time domain position of the PTW, a window length of the PTW, or a DRX cycle in the PTW.

Figure 4:
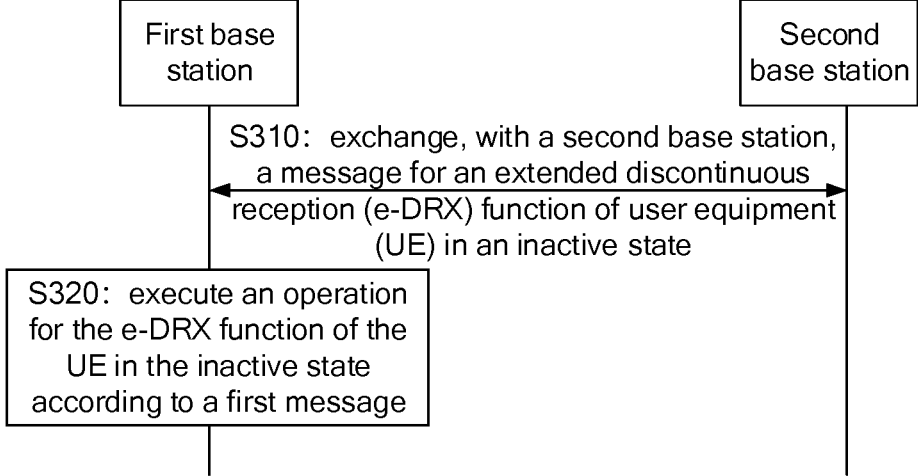
FIG. 4 is a schematic flow diagram of a method for processing information according to an example.

As shown in FIG. 4, the method includes S310, previously described, and further includes the following step S320.

In S320: an operation for the e-DRX function of the UE in the inactive state is executed according to the first message.

In an example, S320 may include at least one of: configuration for the e-DRX function of the UE in the inactive state is executed according to the configuration information; the e-DRX function for the UE in the inactive state is activated according to the activation request; or the e-DRX function for the UE in the inactive state is inactivated according to the inactivation request.

The configuration information indicates that the e-DRX function is configured for the UE in the inactive state.

In an example, the configuration information may be a message only carrying a configuration instruction. Specific configuration of the e-DRX function of the UE in the inactive state may be determined by the e-DRX parameter of the e-DRX function configured for the UE through further negotiation between base stations.

In another example, the configuration information may be a message carrying the e-DRX parameter, such that the base station receiving the first message directly configures the e-DRX function in the inactive state for the UE according to the e-DRX parameter carried by the configuration information.

An example of the disclosure provides a method for processing information, performed by a first base station. The method may be implemented independently or in combination with the above method for processing information. For instance, the base station capability information related to the method for processing information according to the example may be the above first message that is exchanged or may be the message exchanged between the first base station and the second base station through the inter-base-station interface, for the e-DRX function of the UE in the inactive state. As shown in FIGS. 3A-3C, S320 may include the following step: the operation for the e-DRX function of the UE in the inactive state is determined according to the base station capability information; or, the operation for the e-DRX function of the UE in the inactive state is determined according to a protocol.

The configuration and enabling of the e-DRX function for the UE in the inactive state involve not only the anchor base station for the UE in the inactive state, but also all the base stations in the RNA where the anchor base station is located. Thus, whether to configure the e-DRX function for the UE in the inactive state and/or whether to enable the e-DRX function of the UE in the inactive state may be determined through the exchange of the base station capability information.

In some cases, the e-DRX function is configured for the UE in the inactive state, but whether to enable or when to enable the function requires further negotiation and exchange between base stations.

In some cases, the base station may have the capability to support the e-DRX function of the UE in the inactive state or not, so synchronization of capabilities to support configuration and/or activation of the e-DRX function of the UE in the inactive state or not is achieved between base stations in the same RAN through exchange of the base station capability information. Further, the base station may refuse or accept a request from the UE to enable the e-DRX function in the inactive state.

In some cases, whether one or more base stations in corresponding RNAs all support the e-DRX function of the UE in the inactive state may also be indicated according to the communication protocol. The above "protocol" may be understood to include: a communication protocol or a proprietary protocol within a manufacturer other than the communication protocol, or a pre-negotiated protocol between base stations.

In conclusion, the first base station may determine whether other base stations (that is, the second base station) support the e-DRX function of the UE in the inactive state in many ways, so the first base station may also determine basis information of the operation for the e-DRX function of the UE in the inactive state in many ways, which is not limited to the above base station capability information and/or protocols exchanged between the base stations.

In an example, the step that the operation for the e-DRX function of the UE in the inactive state is determined according to the base station capability information includes the following step: in response to the base station capability information indicates that the base station transmitting the first message does not support the e-DRX of the UE in the inactive state, the e-DRX function of the UE in the inactive state is inactivated; or in response to the base station capability information indicates that the base station transmitting the first message does not support the e-DRX of the UE in the inactive state, the e-DRX function of the UE in the inactive state is not activated; or in response to the base station capability information indicates that the base station transmitting the first message supports the e-DRX function of the UE in the inactive state, whether to activate or inactivate the e-DRX function of the UE in the inactive state is determined according to preset information.

If at least one base station in the same RNA indicates that the base station does not support the e-DRX function of the UE in the inactive state through the base station capability information, the UE in the inactive state may miss the RAN paging message when moving to the base station that does not support the e-DRX function of the UE in the inactive state. Further, the UE cannot be paged. In view of that, when the first base station and/or the second base station indicate/indicates that the e-DRX function of the UE in the inactive state is not supported, the e-DRX function of the UE in the inactive state is inactivated, or the e-DRX function is not activated for the UE in the inactive state. Alternatively, the e-DRX function is not configured for the UE in the inactive state.

When all the base stations in the same RAN support the e-DRX function of the UE in the inactive state, whether to activate the e-DRX function of the UE in the inactive state needs to be determined according to the preset information.

In some cases, all the base stations in the same RNA support the e-DRX function of the UE in the inactive state, but it may be unnecessary to activate the e-DRX function of the UE in the inactive state, so the e-DRX function of the UE in the inactive state may also not be activated or inactivated. If necessary, the e-DRX function of the UE in the inactive state may be activated.

In the example, the preset information may be any message reflecting whether the e-DRX function of the UE in the inactive state needs to be activated.

In an example, the step that the operation for the e-DRX function of the UE in the inactive state is determined according to the protocol includes the following step: in response to determining that at least one base station in a radio notification area (RNA) where the first base station is located does not support the e-DRX function of the UE in the inactive state according to the protocol, the e-DRX function of the UE in the inactive state is inactivated; or in response to determining that at least one base station in a radio notification area (RNA) where the first base station is located does not support the e-DRX function of the UE in the inactive state according to the protocol, the e-DRX function of the UE in the inactive state is not activated; or in response to determining that each base station in a radio notification area (RNA) where the first base station is located supports the e-DRX function of the UE in the inactive state according to the protocol, whether to activate or inactivate the e-DRX function of the UE in the inactive state is determined according to the preset information.

If a first base station already activates the e-DXR function of the UE in the inactive state currently, and it is determined according to the protocol that at least one base station in the same RNA does not support the e-DRX function of the UE in the inactive state, the activated e-DRX function in the inactive state is inactivated.

In some examples, the preset information includes at least one of: UE capability information indicating whether the UE in the inactive state supports the e-DRX function in the inactive state; transmission demand information indicating a service transmission demand of the UE in the inactive state; or UE request information indicating whether the UE in the inactive state requests to enable the e-DRX function in the inactive state.

If the UE capability information indicates that the UE does not support the e-DRX function in the inactive state, even if the base station supports the e-DRX function in the inactive state of the UE, it is useless to activate the e-DRX function of the UE in the inactive state for the UE. Thus, the UE capability information may be used as one of the above preset information.

In some cases, the transmission demand information reflects the service transmission demand of the UE. If the current service transmission demand is not suitable for activating the e-DRX function in the inactive state of the UE, the e-DRX function of the UE in the inactive state is inactivated or not activated. If the transmission demand information reflects that the service transmission demand of the UE is suitable for activating the e-DRX function in the inactive state of the UE, the e-DRX function in the inactive state of the UE may be activated.

Whether the service transmission demand here is suitable for activating the e-DRX function in the inactive state of UE may be considered from transmission characteristics such as delay tolerance of service data and concurrency of quality of service (QoS) service data that correspond to the service transmission demand, and whether transmission of service data has periodicity.

In some cases, the UE may request from a network side whether to activate the e-DRX function in the inactive state of the UE according to its own energy-saving purpose and/or service transmission demand.

In an example, the first message includes at least one of: an inter-base-station interface setup request message; a cell activation request message; a cell inactivation request message; a new generation-radio access network (NG-RAN) node configuration update message; a retrieve UE context request message; or a negotiation message for negotiating the e-DRX function of the UE in the inactive state.

Here, the inter-base-station interface setup request message includes, but is not limited to, an X2 setup request message and/or an Xn setup request message. Regarding the inter-base-station interface setup request message, the X2 setup request message is configured for a link of X2 interfaces between base stations; the Xn setup request message may be configured to set up a link of Xn interfaces between base stations. In this way, when the inter-base-station interface is set up, the message for the e-DRX function of the UE in the inactive state is carried. On one hand, the exchange of the message for the e-DRX function of the UE in the inactive state is completed without introducing additional messages between base stations. On the other hand, negotiation for the e-DRX function of the UE in the inactive state is already completed while a link corresponding to the inter-base-station interface is set up.

The negotiation message here may be a message special for negotiating the e-DRX function of the UE in the inactive state.

Regarding the cell activation request message, the cell activation request message may be configured to switch a cell from an inactivated state to an activated state, and the cell activation request message carries the message for the e-DRX function of the UE in the inactive state. On one hand, the exchange of the message for the e-DRX function of the UE in the inactive state is completed without introducing additional messages between base stations. On the other hand, when a certain cell is activated, the message for the e-DRX function of the UE in the inactive state is completed synchronously.

Regarding the cell inactivation request message, the cell inactivation request message may be configured to switch a cell from an activated state to an inactivated state. The cell inactivation request message carries the message for the e-DRX function of the UE in the inactive state. On one hand, the exchange of the message for the e-DRX function of the UE in the inactive state is completed without introducing additional messages between base stations. On the other hand, when a certain cell is activated, the message for the e-DRX function of the UE in the inactive state is completed synchronously. In this way, after the cell is activated again, a corresponding operation may be executed according to the e-DRX function, for the UE in the inactive state, carried in the cell inactivation request message.

The NG-RAN node configuration update message may be configured to exchange an updated configuration of the cell between base stations. For instance, a cell may transmit some updated radio configurations to its neighboring cells through the NG-RAN node configuration update message. The radio configurations include, but are not limited to, transmission configuration of a synchronizing signal block (SSB), etc. Here, only the updated configuration carried in the NG-RAN node configuration update message is carried as an instance for illustration, which does not limit specific implementation. In the example of the disclosure, the message for the e-DRX function of the UE in the inactive state is carried by the NG-RAN node configuration update message, which is equivalent to activation or no activation of the e-DRX function for the UE in the inactive state and/or the e-DRX parameter as one of the configuration updates exchanged between base stations.

The retrieve UE context request message is a message indicating that a target base station requests UE context from a source base station after the UE switches a service cell. In the example of the disclosure, some pieces of UE support and/or activate the e-DRX function in the inactive state, and some pieces of UE do not support and/or inactivate the e-DRX function in the inactive state, such that the message for the e-DRX function of the UE in the inactive state may be exchanged through the UE context request message at UE granularity or cell granularity. In the case where the message for the e-DRX function of the UE in the inactive state may be exchanged through the UE context request message at the UE granularity, it allows for specific negotiation on whether to activate or inactivate the e-DRX function in the inactive state for a certain piece of UE, and/or allows for specific negotiation on whether to inactivate the activated e-DRX function in the inactive state for a certain piece of UE. In the case where the message for the e-DRX function of the UE in the inactive state may be exchanged through the UE context request message at the cell granularity, the base station may inactivate/activate the e-DRX function for the UE in the inactive state in a corresponding cell.

For instance, the negotiation message here may be a message special for negotiating the e-DRX function of the UE in the inactive state.

For instance, the negotiation message may be any message except the above the inter-base-station interface setup message, the cell activation request message, the cell inactivation request message, the new generation-radio access network node configuration update message, and the retrieve UE context request message.

Figure 5:
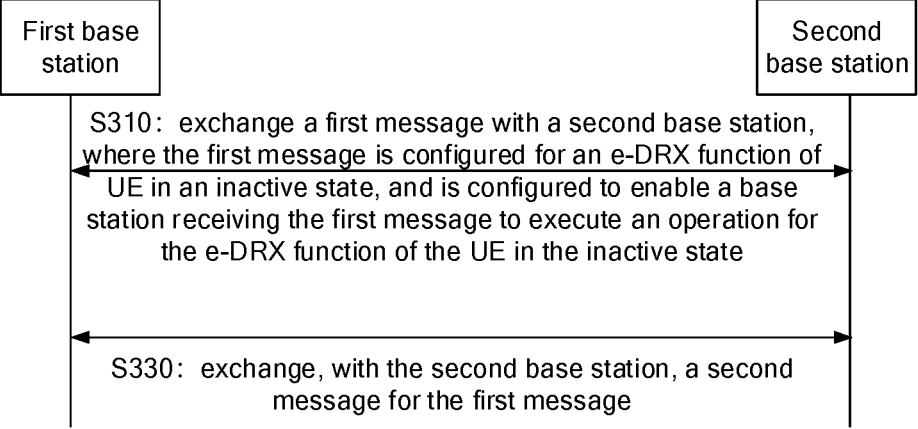
FIG. 5 is a schematic flow diagram of a method for processing information according to an example

As shown in FIG. 5, the step that the message for the extended discontinuous reception (e-DRX) function of the user equipment (UE) in the inactive state is exchanged with the second base station further includes the following step S330.

In S330: a second message for the first message is exchanged with the second base station.

If the first base station and the second base station already exchanged the first message with each other, the second message is a response message for the e-DRX function of the UE in the inactive state carried by the first message. The response message may include an acknowledgement response, a deny acknowledgement response, and/or a modification to the content carried by the first message.

For instance, the first message may be a request message and the second message may be a response message for the request message.

In an example, the second message includes at least one of a first feedback message, a second feedback message, an activation response, or an inactivation response.

The first feedback message indicates whether base station capability information has been received, where the base station capability information at least indicates whether the base station transmitting the base station capability information supports the e-DRX function of the UE in the inactive state.

The second feedback message indicates whether configuration information has been received, where the configuration information at least indicates configuration for the e-DRX function of the UE in the inactive state.

The activation response indicates that the e-DRX function of the UE in the inactive state is activated.

The inactivation response indicates that the e-DRX function of the UE in the inactive state is inactivated.

In an example, both the first feedback message and the second feedback message may carry feedback bits. Different values of the feedback bits may indicate an acknowledgement character (ACK) or a deny acknowledgement character (NACK).

The activation response may be considered as a response to the activation request in the above example. The inactivation response is a response to the inactivation request.

In an example, the step that the second message for the first message is exchanged with the second base station includes at least one of: in response to the first message is an inter-base-station interface setup request message, an Xn setup response is exchanged with the second base station; in response to the first message is a cell activation request message, a cell activation response message is exchanged with the second base station; in response to the first message is a cell inactivation request message, a cell inactivation response message is exchanged with the second base station; in response to the first message is a new generation-radio access network node configuration update message, a new generation-radio access network node configuration update response message is exchanged with the second base station; in response to the first message is a retrieve UE context request message, a retrieve UE context response message is exchanged with the second base station; or in response to the first message is a negotiation message for negotiating the e-DRX function of the UE in the inactive state, a negotiation response message is returned to the second base station.

In an example, the retrieve UE context response message includes a resume container information element (IE), and the resume container IE carries a response result for the first message. The resume container IE may carry the message for the e-DRX function of the UE in the inactive state.

In some scenarios, the message for the e-DRX function of the UE in the inactive state is negotiated through the retrieve context request message, so the base station receiving the context request message may return a retrieve context failure response message. The retrieve context failure response message may carry the message for the e-DRX function of the UE in the inactive state. The retrieve context failure response message may carry the above resume container information element (IE), and the target base station directly transmits the information element to the terminal after receiving it. By using the function, an operation of an original base station for the e-DRX function of the UE in the inactive state may be carried out.

In an example, the first base station and the second base station belong to the same radio notification area (RNA). For instance, the first base station is an anchor base station for the UE in the inactive state, and the second base station is a non-anchor base station for the UE in the inactive state; or, the second base station is an anchor base station for the UE in the inactive state, and the first base station is a non-anchor base station for the UE in the inactive state.

An example of the disclosure provides a working mode in which the UE in the inactive state uses the e-DRX function, that is, a method, for an e-DRX mode of the UE in the inactive state, for processing information according to the example of the disclosure.

For instance, the base stations negotiate the working mode of activating/inactivating e-DRX in the inactive state for users in the inactive state.

The base stations exchange DRX/e-DRX parameters, for instance, through the exchange of the DRX/e-DRX parameters; that is, a target base station is informed of a default DRX cycle or a default RAN paging cycle. The target base station may be a base station in which the anchor base station for the UE is located in the same RAN.

In an example, the information is added to an inter-base-station exchange message, for instance, the Xn setup request/Xn setup response.

In an example, a non-anchor base station may inform an anchor base station of information that e-DRX in the inactive state is supported or not supported by the users in the inactive state when conducting Xn interface exchange with the anchor base station.

In an example, the information is added to an inter-base-station exchange message, for instance, the Xn setup request/Xn setup response.

In an example, the information is added to an inter-base-station exchange message, for instance, the cell activation request/cell activation response.

In an example, the information is added to an inter-base-station exchange message, for instance, the NG-RAN node configuration update/NG-RAN node configuration update acknowledge.

In an example, the information for the e-DRX function of the UE in the inactive state may be carried in any signaling in the related technology, and may also be carried in newly added signaling.

In another example, in the above signaling, the information on whether the users in the inactive state support the e-DRX function in the inactive state may be further refined to an indication for the cell granularity, that is, the indication carried by the signaling is an indication per cell.

In an example, if the anchor base station determines that one or more base stations supporting the e-DRX function in the inactive state exists within an RNA, the e-DRX function in the inactive state of the UE that the anchor base station serves is not activated.

In an example, it may be agreed according to the protocol in advance that all the base stations within an RNA have the same support capability for the e-DRX function in the inactive state.

In an example, for a non-anchor base station that does not support the e-DRX function in the inactive state, a request to inactivate the e-DRX function in the inactive state may be initiated to the anchor base station.

In an example, a request indication of the e-DRX function in the inactive state of the UE is added to an inter-base-station exchange message, for instance, the retrieve UE context request is added to an inter-base-station exchange message, which is configured to request the anchor base station to inactivate the e-DRX function.

In an example, a response indication of inactivating the e-DRX function in the inactive state for the UE is added to an inter-base-station exchange message; for instance, the retrieve UE context response message is added to an inter-base-station exchange message.

In an example, a response indication of the e-DRX function in the inactive state of the UE is added to an inter-base-station exchange message; for instance, the retrieve UE context failure message is added to an inter-base-station exchange message. The retrieve UE context failure message is carried in the resume container IE.

The specific behaviors are described as follows: when the anchor base station obtains the request indication of the e-DRX function in the inactive state of the UE from the retrieve UE context request, the response indication of the e-DRX function in the inactive state of the UE needs to be added in the retrieve UE context failure message. The retrieve UE context failure message is carried in the resume container IE. In this case, the non-anchor base station may transmit the IE to the UE (including an RRC release message). In this case, the non-anchor base station may keep the terminal device in the inactive state or release the terminal device to an idle state.

In an example, the non-anchor base station supporting the e-DRX function initiates activation/inactivation of the e-DRX function in the inactive state, and modification of the e-DRX parameter, etc. However, for the anchor base station that does not support the e-DRX function, it is necessary to ask the anchor base station to inactivate the e-DRX function in the inactive state.

Figure 6:
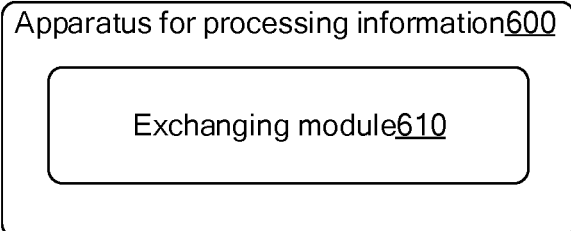
FIG. 6 is a schematic structural diagram of an apparatus for processing information according to an example.

As shown in FIG. 6, an example of the disclosure provides an apparatus for processing information 600, performed by a first base station. The apparatus 600 includes an exchanging module 610.

The exchanging module 610 is configured to exchange, with a second base station, a message for an extended discontinuous reception (e-DRX) function of a user equipment (UE) in an inactive state.

In an example, the exchanging module 610 may be a program module. The program module is capable of exchanging, with the second base station, the message for the e-DRX function of the UE in the inactive state after being executed by a processor.

In another example, the exchanging module 610 may be a hardware-software module. The hardware-software module may include various programmable arrays. The programmable arrays include, but are not limited to, a complex programmable array or a field programmable gate array.

In yet another example, the exchanging module 610 may further include: a pure hardware module. The pure hardware module includes, but is not limited to, an application-specific integrated circuit.

In an example, the exchanging module 610 is configured to exchange, with the second base station, the message for the e-DRX function of the UE in the inactive state through an inter-base-station interface.

In an example, the exchanging module 610 is configured to exchange a first message with the second base station. The first message is configured for the e-DRX function of the UE in the inactive state, and is configured to enable a base station receiving the first message to execute an operation for the e-DRX function of the UE in the inactive state.

In an example, the first message carries at least one of: base station capability information, configuration information, an activation request, or an inactivation request.

The base station capability information indicates whether a base station transmitting the first message supports the e-DRX function of the UE in the inactive state.

The configuration information indicates that a base station transmitting the first message is the e-DRX function of the UE in the inactive state, where the configuration information includes at least one e-DRX parameter for the e-DRX function.

The activation request indicates that a base station transmitting the first message requests to activate the e-DRX function of the UE in the inactive state.

The inactivation request indicates that a base station transmitting the first message requests to inactivate the e-DRX function of the UE in the inactive state.

In an example, the apparatus 600 further includes a determination module, not shown.

The determination module is configured to determine the operation for the e-DRX function of the UE in the inactive state according to the base station capability information; or, determine the operation for the e-DRX function of the UE in the inactive state according to a protocol.

In an example, the determination module is configured to inactivate, in response to the base station capability information indicates that the base station transmitting the first message does not support the e-DRX of the UE in the inactive state, the e-DRX function of the UE in the inactive state; or, not activate, in response to the base station capability information indicates that the base station transmitting the first message does not support the e-DRX of the UE in the inactive state, the e-DRX function of the UE in the inactive state; or, determine, in response to the base station capability information indicates that the base station transmitting the first message supports the e-DRX function of the UE in the inactive state, whether to activate or inactivate the e-DRX function of the UE in the inactive state according to preset information.

In an example, the determination module is configured to inactivate, in response to determining that at least one base station in a radio notification area (RNA) where the first base station is located does not support the e-DRX function of the UE in the inactive state according to the protocol, the e-DRX function of the UE in the inactive state; or, not activate, in response to determining that at least one base station in a radio notification area (RNA) where the first base station is located does not support the e-DRX function of the UE in the inactive state according to the protocol, the e-DRX function of the UE in the inactive state; or, determine, in response to determining that each base station in a radio notification area (RNA) where the first base station is located supports the e-DRX function of the UE in the inactive state according to the protocol, whether to activate or inactivate the e-DRX function of the UE in the inactive state according to preset information.

In an example, the preset information includes at least one of the UE capability information, transmission demand information, or UE request information.

The UE capability information indicates whether the UE in the inactive state supports the e-DRX function in the inactive state.

The transmission demand information indicates a service transmission demand of the UE in the inactive state.

The UE request information indicates whether the UE in the inactive state requests to enable the e-DRX function in the inactive state.

In an example, the apparatus 600 further includes an execution module, not shown.

The execution module is configured to execute at least one of: configuration for the e-DRX function of the UE in the inactive state is executed according to the configuration information; the e-DRX function for the UE in the inactive state is activated according to the activation request; or the e-DRX function for the UE in the inactive state is inactivated according to the inactivation request.

In an example, the first message includes at least one of: an inter-base-station interface setup request message; a cell activation request message; a cell inactivation request message; a new generation-radio access network node configuration update message; a retrieve UE context request message; or a negotiation message for negotiating the e-DRX function of the UE in the inactive state.

In an example, the exchanging module 610 is further configured to exchange, with the second base station, a second message for the first message.

In an example, the second message includes at least one of a first feedback message, a second feedback message, an activation response, or an inactivation response.

The first feedback message indicates whether the base station capability information is received, where the base station capability information at least indicates whether a base station transmitting the base station capability information supports the e-DRX function of the UE in the inactive state.

The second feedback message indicates that configuration information for the e-DRX function of the UE in the inactive state is received.

The activation response indicates that the e-DRX function of the UE in the inactive state is activated.

The inactivation response indicates that the e-DRX function of the UE in the inactive state is inactivated.

In an example, the exchanging module 610 is configured to execute at least one of: in response to the first message is an inter-base-station interface setup request message, an Xn setup response message is exchanged with the second base station; in response to the first message is a cell activation request message, a cell activation response message is exchanged with the second base station; in response to the first message is a cell inactivation request message, a cell inactivation response message is exchanged with the second base station and returned; in response to the first message is a new generation-radio access network node configuration update message, a new generation-radio access network node configuration update response message is exchanged with the second base station and returned; in response to the first message is a retrieve UE context request message, a retrieve UE context response message is exchanged with the second base station and returned; or in response to the first message is a negotiation message for negotiating the e-DRX function of the UE in the inactive state, a negotiation response message is returned to the second base station.

In an example, the retrieve UE context response message includes a resume container information element (IE), and the resume container IE carries a response result for the first message.

In an example, the retrieve UE context response message is a retrieve context failure message.

In an example, the first base station and the second base station belong to the same radio notification area (RNA).

In an example, the first base station is an anchor base station for the UE in the inactive state, and the second base station is a non-anchor base station for the UE in the inactive state; or, the second base station is an anchor base station for the UE in the inactive state, and the first base station is a non-anchor base station for the UE in the inactive state.

An example of the disclosure provides a communication device. The communication device includes a memory configured to store an instruction executable by a processor, and a processor connected to the memory.

The processor is configured to execute the method for controlling a terminal and/or the method for processing information according to any one of the above technical solutions.

The processor may include various types of storage media. The storage media are non-temporary computer storage media, and may continue to store information stored in the communication device after the communication device is powered off.

Here, the communication device may at least include a first base station.

The processor may be connected to the memory by means of a bus, etc., and is configured to read an executable program stored in the memory, such as at least one of the methods shown in FIGS. 2, 3A, 3B, 3C, 4, and 5.

Figure 7:
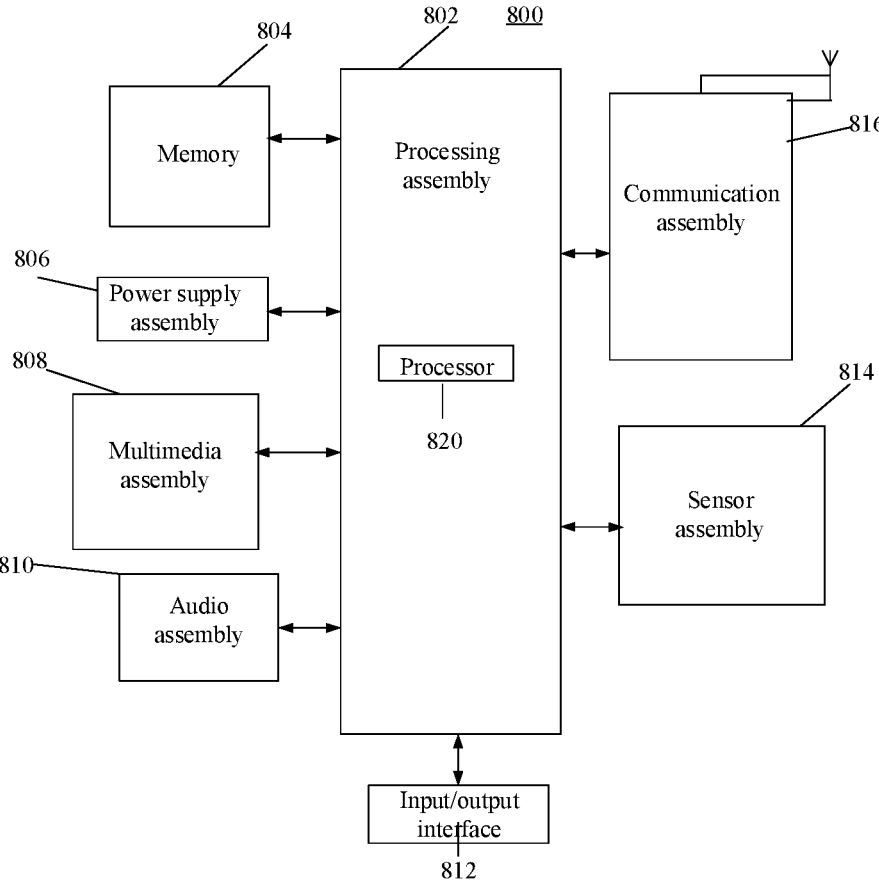
FIG. 7 is a schematic structural diagram of a user equipment (UE) according to an example.

FIG. 7 is a block diagram of UE 800 according to an example. For instance, the UE 800 may be a mobile phone, a computer, a digital broadcast user device, a messaging device, a game console, a tablet device, a medical device, a fitness device, a personal digital assistant, etc.

With reference to FIG. 7, the UE 800 may include one or more of the following assemblies: a processing assembly 802, a memory 804, a power supply assembly 806, a multimedia assembly 808, an audio assembly 810, an input/output (I/O) interface 812, a sensor assembly 814, and a communication assembly 816.

The processing assembly 802 generally controls all operations of the UE 800, such as operations associated with display, telephone call, data communication, camera operation, and recording operations. The processing assembly 802 may include one or more processors 820 configured to execute an instruction, so as to complete all or some steps of the method. In addition, the processing assembly 802 may include one or more modules to facilitate interaction between the processing assembly 802 and other assemblies. For instance, the processing assembly 802 may include a multimedia module to facilitate interaction between the multimedia assembly 808 and the processing assembly 802.

The memory 804 is configured to store various types of data to support operations on the UE 800. Instances of the data include an instruction for any application or method operating on the UE 800, contact data, phone book data, a message, a picture, a video, etc. The memory 804 may be implemented by any type of volatile or nonvolatile memory device or their combination, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply assembly 806 supplies power to various assemblies of the UE 800. The power supply assembly 806 may include a power management system, one or more power supplies, and other assemblies associated with generating, managing, and distributing power for the UE 800.

The multimedia assembly 808 includes a screen that provides an output interface between the UE 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, slide, and gestures on the touch panel. The touch sensor may sense a boundary of a touch or slide operation, and detect duration and pressure related to the touch or slide operation. In some examples, the multimedia assembly 808 includes a front-facing camera and/or a rear-facing camera. When the UE 800 is in an operation mode, such as a shooting mode or a video mode, the front-facing camera and/or the rear-facing camera may receive external multimedia data. Each of the front-facing and the rear-facing cameras may be a fixed optical lens system or have a focal length and optical zoom capability.

The audio assembly 810 is configured to output and/or input an audio signal. For instance, the audio assembly 810 includes a microphone (MIC). The microphone is configured to receive an external audio signal when the UE 800 is in operation modes such as a call mode, a recording mode, and a voice identification mode. The received audio signal may be further stored in the memory 804 or transmitted via the communication assembly 816. In some examples, the audio assembly 810 further includes a speaker configured to output an audio signal.

The I/O interface 812 provides an interface between the processing assembly 802 and a peripheral interface module. The peripheral interface module may be a keyboard, a click wheel, a button, etc. The buttons may include, but are not limited to, a home button, a volume button, a start button, and a lock button.

The sensor assembly 814 includes one or more sensors for providing various aspects of state assessment for the UE 800. For instance, the sensor assembly 814 may detect an on/off state of the UE 800 and the relative positioning of the assemblies, such as a display and a keypad of the UE 800. The sensor assembly 814 may further detect position change of the UE 800 or an assembly of the UE 800, presence or absence of contact between the user and the UE 800, an orientation or acceleration/deceleration of the UE 800, and temperature change of the UE 800. The sensor assembly 814 may include a proximity sensor configured to detect the presence of a nearby object without any physical contact. The sensor assembly 814 may further include an optical sensor, such as a complementary metal-oxide-semiconductor (CMOS) or charge-coupled device (CCD) image sensor, which is used in an imaging application. In some examples, the sensor assembly 814 may further include an acceleration sensor, a gyroscope sensor, a magnetic sensor, a pressure sensor, or a temperature sensor.

The communication assembly 816 is configured to facilitate wired or wireless communication between the UE 800 and other devices. The UE 800 may access a wireless network based on a communication standard, such as WiFi, the 2nd generation mobile communication technology (2G) or the 3rd generation mobile communication technology (3G), or their combination. In an example, the communication assembly 816 receives a broadcast signal or broadcast-related information from an external broadcast management system via a broadcast channel. In an example, the communication assembly 816 further includes a near field communication (NFC) module to facilitate short-range communication. For instance, the NFC module may be implemented on the basis of a radio frequency identification (RFID) technology, an infrared data association (IrDA) technology, an ultra-wideband (UWB) technology, a Bluetooth (BT) technology, or other technologies.

In an example, the UE 800 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components, thus executing the method.

In an example, there is further provided a non-transitory computer-readable storage medium including an instruction, such as the memory 804 including an instruction. The instruction may be executed by the processor 820 of the UE 800 so as to complete the method. For instance, the non-transitory computer-readable storage medium may be a ROM, a random access memory (RAM), a CD-ROM, a magnetic tape, a floppy disk, an optical data storage device, etc.

Figure 8:
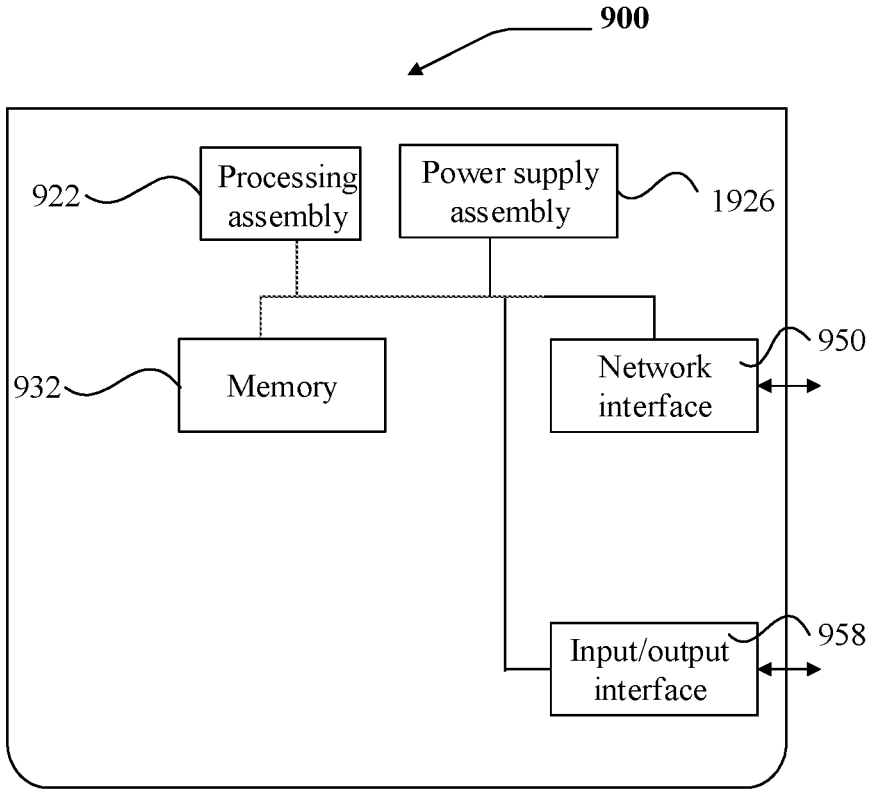
FIG. 8 is a schematic structural diagram of a communication device according to an example.

As shown in FIG. 8, an example of the disclosure shows a structure of a communication device. For instance, a communication device 900 may be used as a network device. The communication device may be the above access device and/or core network device.

With reference to FIG. 8, the communication device 900 includes a processing assembly 922, which further includes one or more processors (not shown), and a memory resource represented by a memory 932, which is configured to store instructions executable by the processing assembly 922, such as applications. The applications stored in the memory 932 may include one or more modules that each corresponds to a group of instructions. In addition, the processing assembly 922 is configured to execute instructions, so as to execute any one of the methods applied to the access device, for instance, at least one of the methods shown in FIGS. 2, 3A, 3B, 3C, 4, and 5.

The communication device 900 may further include a power supply assembly 926 configured to conduct power management of the communication device 900, a wired or radio network interface 950 configured to connect the communication device 900 to a network, and an I/O interface 958. The communication device 900 may operate on the basis of an operating system stored in the memory 932, such as Windows Server™, Mac OS X™, Unix™, Linux™, FreeBSD™, etc.

Those skilled in the art could easily conceive of other implementation solutions of the disclosure upon consideration of the description and practice of the invention disclosed here. The disclosure is intended to cover any variations, uses, or adaptive changes of the disclosure, and these variations, uses, or adaptive changes follow the general principles of the disclosure and include common general knowledge or conventional technical in the art that are not disclosed in the present disclosure. The description and the examples are to be regarded as merely illustrative, and the true scope and spirit of the disclosure are indicated by the following claims.

It is to be understood that the disclosure is not limited to a precise structure which is described above and illustrated in the accompanying drawings, and can be modified or changed in various ways without departing from the scope. The scope of the disclosure is limited merely by the appended claims.

What is claimed is:

1. A method for processing information, performed by a first base station, and the method comprising:

exchanging, with a second base station, a message for an extended discontinuous reception (e-DRX) function of user equipment (UE) in an inactive state; and determining an operation for the e-DRX function of the UE in the inactive state according to base station capability information or a protocol, wherein the base station capability information is configured to indicate whether the base station transmitting the message supports the e-DRX function of the UE in the inactive state, and wherein the protocol is configured to determine whether each base station in a radio notification area (RNA) where the first base station is located supports the e-DRX function of the UE in the inactive state.

2. The method according to claim 1, wherein the exchanging, with the second base station, the message for the e-DRX function of the UE in the inactive state comprises:

exchanging, with the second base station, the message for the e-DRX function of the UE in the inactive state through an inter-base-station interface.

3. The method according to claim 1, wherein the exchanging, with the second base station, the message for the e-DRX function of the UE in the inactive state comprises:

exchanging a first message with the second base station, wherein the first message is configured for the e-DRX function of the UE in the inactive state, and is configured to enable a base station receiving the first message to execute the operation for the e-DRX function of the UE in the inactive state.

4. The method according to claim 3, wherein the first message carries at least one of:

the base station capability information indicating whether a base station transmitting the first message supports the e-DRX function of the UE in the inactive state;

configuration information indicating that a base station transmitting the first message is the e-DRX function of the UE in the inactive state, wherein the configuration information comprises at least one e-DRX parameter for the e-DRX function;

an activation request indicating that a base station transmitting the first message requests to activate the e-DRX function of the UE in the inactive state; or an inactivation request indicating that a base station transmitting the first message requests to inactivate the e-DRX function of the UE in the inactive state.

5. The method according to claim 3, wherein the determining the operation for the e-DRX function of the UE in the inactive state according to the base station capability information comprises:

inactivating, in response to the base station capability information indicates that the base station transmitting the first message does not support the e-DRX of the UE in the inactive state, the e-DRX function of the UE in the inactive state; or not activating, in response to the base station capability information indicates that the base station transmitting the first message does not support the e-DRX of the UE in the inactive state, the e-DRX function of the UE in the inactive state; or determining, in response to the base station capability information indicates that the base station transmitting the first message supports the e-DRX function of the UE in the inactive state, whether to activate or inactivate the e-DRX function of the UE in the inactive state according to preset information.

6. The method according to claim 3, wherein the determining the operation for the e-DRX function of the UE in the inactive state according to the protocol comprises:

inactivating, in response to determining that at least one base station in the radio notification area (RNA) where the first base station is located does not support the e-DRX function of the UE in the inactive state according to the protocol, the e-DRX function of the UE in the inactive state; or not activating, in response to determining that at least one base station in the radio notification area (RNA) where the first base station is located does not support the e-DRX function of the UE in the inactive state according to the protocol, the e-DRX function of the UE in the inactive state; or determining, in response to determining that each base station in the radio notification area (RNA) where the first base station is located supports the e-DRX function of the UE in the inactive state according to the protocol, whether to activate or inactivate the e-DRX function of the UE in the inactive state according to preset information.

7. The method according to claim 5, wherein the preset information comprises at least one of:

UE capability information indicating whether the UE in the inactive state supports the e-DRX function in the inactive state;

transmission demand information indicating a service transmission demand of the UE in the inactive state; or UE request information indicating whether the UE in the inactive state requests to enable the e-DRX function in the inactive state.

8. The method according to claim 4, the method further comprising at least one of:

executing configuration for the e-DRX function of the UE in the inactive state according to the configuration information;

activating the e-DRX function for the UE in the inactive state according to the activation request; or inactivating the e-DRX function for the UE in the inactive state according to the inactivation request.

9. The method according to claim 3, wherein the first message comprises at least one of:

an inter-base-station interface setup request message;

a cell activation request message;

a cell inactivation request message;

a new generation-radio access network node configuration update message;

a retrieve UE context request message; or a negotiation message for negotiating the e-DRX function of the UE in the inactive state.

10. The method according to claim 3, wherein the exchanging, with the second base station, the message for the e-DRX function of the UE in the inactive state further comprises:

exchanging, with the second base station, a second message for the first message.

11. The method according to claim 10, wherein the second message comprises at least one of:

a first feedback message indicating whether the base station capability information is received, wherein the base station capability information at least indicates whether a base station transmitting the base station capability information supports the e-DRX function of the UE in the inactive state;

a second feedback message indicating that configuration information for the e-DRX function of the UE in the inactive state is received;

an activation response indicating that the e-DRX function of the UE in the inactive state is activated; or an inactivation response indicating that the e-DRX function of the UE in the inactive state is inactivated.

12. The method according to claim 10, wherein the exchanging, with the second base station, the second message for the first message comprises at least one of:

exchanging, in response to the first message is an inter-base-station interface setup request message, an Xn setup response message with the second base station;

exchanging, in response to the first message is a cell activation request message, a cell activation response message with the second base station;

exchanging, in response to the first message is a cell inactivation request message, with the second base station and returning a cell inactivation response message;

exchanging, in response to the first message is a new generation-radio access network node configuration update message, with the second base station and returning a new generation-radio access network node configuration update response message;

exchanging, in response to the first message is a retrieve UE context request message, with the second base station and returning a retrieve UE context response message; or returning, in response to the first message is a negotiation message for negotiating the e-DRX function of the UE in the inactive state, a negotiation response message to the second base station.

13. The method according to claim 12, wherein the retrieve UE context response message comprises a resume container information element (IE); and the resume container IE carries a response result for the first message.

14. The method according to claim 12, wherein the retrieve UE context response message is a retrieve context failure message.

15. The method according to claim 1, wherein the first base station and the second base station belong to the same radio notification area (RNA).

16. The method according to claim 1, wherein the first base station is an anchor base station for the UE in the inactive state, and the second base station is a non-anchor base station for the UE in the inactive state; or the second base station is an anchor base station for the UE in the inactive state, and the first base station is a non-anchor base station for the UE in the inactive state.

17. A communication device, comprising one or more processors, a transceiver, a memory, and an executable program stored in the memory and runnable by the one or more processors, wherein the one or more processors, when collectively executing the executable program, cause the communication device to:

exchange, with a second base station, a message for an extended discontinuous reception (e-DRX) function of user equipment (UE) in an inactive state; and determine an operation for the e-DRX function of the UE in the inactive state according to base station capability information or a protocol, wherein the base station capability information is configured to indicate whether the base station transmitting the message supports the e-DRX function of the UE in the inactive state, and wherein the protocol is configured to determine whether each base station in a radio notification area (RNA) where the first base station is located supports the e-DRX function of the UE in the inactive state.

18. A non-transitory computer-readable storage medium, storing an executable program, wherein the executable program, when executed by one or more processors of a communication device, causes the communication device to:

exchange, with a second base station, a message for an extended discontinuous reception (e-DRX) function of user equipment (UE) in an inactive state; and determine an operation for the e-DRX function of the UE in the inactive state according to base station capability information or a protocol, wherein the base station capability information is configured to indicate whether the base station transmitting the message supports the e-DRX function of the UE in the inactive state, and wherein the protocol is configured to determine whether each base station in a radio notification area (RNA) where the first base station is located supports the e-DRX function of the UE in the inactive state.

19. The communication device according to claim 17, wherein the one or more processors, when collectively executing the executable program, further cause the communication device to:

exchange, with the second base station, the message for the e-DRX function of the UE in the inactive state through an inter-base-station interface.

* * * * *